Patented Feb. 22, 1949

2,462,124

UNITED STATES PATENT OFFICE 2,462,124

MANUFACTURE OF AMINO ACIDS

Carl Neuberg and Hilda Lustig, New York, N. Y., assignors to Interchemical Corporation, New York, N. Y., a corporation of Ohio No Drawing. Application January 19, 1946, Serial No. 642,431

4 Claims. (Cl. 260—529)

This invention relates to a novel method for recovering amino acids, and is directed particularly at a method by means of which it is possible, by a simple and economic procedure, to obtain substantially quantitative yields of amino acids pure with respect to physiological activity from the hydrolysis products of proteins.

The amino acids have been the subject of much investigation, and many methods have been used for their recovery and isolation. In general, the methods used have been selective, i. e., they isolated and purified some of the amino acids, while rejecting others. No universal precipitant, which would separate all amino acids from all foreign material, has as yet been produced.

Foreign materials or impurities found in acidic hydrolysates of proteinous matter consist, besides ammonia which may easily be driven out, chiefly of melanin or humin bodies in amounts up to three percent of the hydrolyzed protein, the quantity apparently depending to some extent upon the ratio of certain constituents of the protein in question. The nature of this formation of humin in the acidic hydrolysis of protein is not accurately known. It has been described as a condensation of tryptophane, and probably of tyrosine, with aldehydic substances and is caused, no doubt, also by a partial destruction and change of chemical configuration of carbohydrates which are frequently found associated, in considerable amounts, with various protein materials. Carbohydrates may be present as such, or as glucosamine, or as part of nucleic acid; the latter being also the source of purines and of phosphoric acid. Phosphatides and lipoids, accompanying the protein, may be the source of still other impurities in the hydrolysate.

Most of these impurities, including a portion of the humin bodies, are soluble (an indication of the solubility of humin is the reddish to dark brown color of the hydrolysate) and it is for this incidental solubility of foreign susbtances that it has not been possible, as yet, to effectuate an efficient separation of a physiologically innocuous and ratio-complete amino acid mixture from acid hydrolyzed proteins and especially from proteins of lesser purity.

It must be recalled that every protein and, consequently, every protein hydrolysate contains a definite ratio of the various amino acids, the building stones of the protein molecule and it is the ratio at which the nutritionally indispensable amino acids are present that determines the biological value of a given protein or protein hydrolysate.

An attempt at purifying and separating, after acidic protein hydrolysis, the amino acid mixture from the foreign constituents of the hydrolysate and using thereby orthodox methods, such as charcoal clarification, concentration in vacuo and recrystallization, will encounter not only excessive technical difficulties but will result in extremely high overall losses and, which is of the utmost importance, such procedures will result in an unbalancing of the original ratio since the losses of some amino acids tend to exceed the losses of others; the resulting product will be unsuitable, in many cases, for specific nutritional or scientific purposes.

On the other hand, amino acids containing the slightest traces of the aforementioned impurities cannot be applied intravenously in view of the toxicity of these foreign materials and such less pure amino acid mixtures have shown to be nutritionally inferior compared with the original protein in oral administrations.

In consideration of these apparently unsurmountable obstacles encountered in purifying acid hydrolysates, whenever it was not a question of obtaining amino acids singly or in specific groups, but of making available, for medicinal or scientific purposes, ratio-true breakdown products of protein, the art has given preference, until now, to enzymatic protein hydrolysis, notwithstanding the difficulties in carrying an enzymatic proteolysis to completeness.

As useful as such incomplete hydrolysates of protein may be for certain nutritional purposes, the presence of peptides and dipeptides limits their value substantially in parenteral application, in the study of specific nutritional problems and in investigations on the relation of diet to detoxication.

Whereas the formation of metal salts of amino acids has been used before to precipitate and to separate individual amino acids or closely related groups, we have discovered that it is possible, after the formation of such metal complexes, to retain in solution all the amino acids of a protein hydrolysate and to carry down, at the same time, impurities contained in the solution and we make use of this discovery in separating and producing, with high yields, physiologically pure amino acid mixtures from hydrolyzed protein.

In its preferred form, our method involves the treatment of the aqueous mixture with an excess of nascent metallic hydrate over theoretical, whereby the amino acids are immediately converted to soluble metallic complexes or salts and whereby impurities, contained in the solution, are carried down as precipitate. After removal of the precipitate, the solution is preferably concentrated to just short of crystallization, followed by the addition of a water-miscible non-solvent for the metal-amino acid compound and separation of the precipitate from the mother liquor. Most of the amino acids are present in the form of metal compounds in the precipitate; a very small percentage remains in the mother liquor. The metal-amino acid compounds in the mother liquor are recovered by concentration and reprecipitation, and the precipitates combined. The free acids may be recovered from the salts by treatment with a precipitant for the metal—e. g. hydrogen sulfide. Almost quantitative recovery of the crystalline amino acids is obtained.

We have found, however, that amino acid mixtures of satisfactory purity may be obtained, in many instances, by eliminating the step of solvent precipitation of the metal-amino acid complexes.

Our preferred reagent is nascent copper hydrate, because of the excellent results obtained with it. Nascent nickel and cobalt hydrates act like nascent copper hydrate, and may be used; but they are more expensive and consequently are not so desirable. Similarly, zinc, manganese and cadmium may also be used; but they frequently give sticky salts, which are difficult to handle, and so are less useful technically.

We may start with, say, a sulfuric acid hydrolysis product of a protein. This product contains all of the amino acids that compose the original protein except trytophane. It also contains free ammonia, and substantial percentages of impurities. The sulfuric acid is precipitated wth barium or other alkaline earth, and the ammonia present is liberated by conversion to free ammonia ($Ba(OH)_2$ will do both) and driven off.

An aliquot portion of the hydrolysate solution is boiled for several hours with copper carbonate, to determine how much will dissolve in the solution, and the amount of copper salt (preferably the sulfate), equivalent to the dissolved carbonate, is calculated. A slight excess (say, 10%, over theoretical) of the salt is then dissolved in water, and the solutions mixed. Nascent cupric hydrate is obtained by treatment with an alkali such as barium or other alkaline earth hydrate; this instantaneously reacts with the amino acids to form copper compounds, which are salts, or complexes. The use of the sulfate and the alkaline earth hydrates permits the quantitative removal of both the alkaline earth and the sulfate as insoluble matter; if calcium is used, the soluble traces are eliminated with barium and oxalic acid. The precipitate, while consisting in the main part of alkaline earth sulfate and excess copper hydrate, removes not only humins, melanins and various other colloidal impurities by adsorption, but also comprises insoluble copper salts of other impurities present. The solution, after being separated from the precipitate contains principally the copper compounds of the amino acids.

The solution is then concentrated, either to precipitation or just short of it. If it is concentrated to precipitate all of the copper compounds, they may be dissolved in tetrahydrofurfuryl alcohol and water, and the solution precipitated with acetone or other miscible precipitants. Preferably, the aqueous solution is concentrated just short of precipitation, and the solution is treated with a precipitant such as acetone; the copper compounds of the amino acids are obtained as a bluish white, easily filterable precipitate. A portion of the amino acids (largely proline and oxyproline) remains in the acetone mother liquor; it can be recovered by further concentration, and precipitation with a miscible precipitant. Both, methanol and ethanol are suitable for this purpose, but we prefer the use of ethanol.

The combined precipitates are taken up in water, the copper is precipitated from the solution, preferably with hydrogen sulfide, and the solution of amino acids is then crystallized. Practically colorless crystals are obtained; the mixture resulting consists of all the amino acids present in the acid hydrolysis product in substantially quantitative yield.

As precipitants for the copper salts of the amino acids, we may use substantially any of the water soluble ketones, ethers and some alcohols. To get maximum separation from any remaining impurities, we find that ketones, such as acetone and methyl ethyl ketone and the cyclic ether dioxane, are highly desirable.

Typical of our inventions are the following:

Example I 100 g. casein are added to 600 cc. of 35% sulfuric acid, and kept at water bath temperature, until the main part is dissolved. Then the mixture is boiled under reflux for 16 hours. An alternative procedure is to heat for 6 hours in the autoclave at 110° C.

The hydrolysate is neutralized with the calculated quantity of barium hydroxide solution, both solutions should be hot for better precipitation of $BaSO_4$. For obtaining good yields, it is essential to boil out the $BaSO_4$ precipitate at least once more with about 500 cc. $H_2O$. After filtering, the solution, which was dark purple before, is light, the $BaSO_4$ precipitate having adsorbed large quantities of dark colored by-products.

The capacity of this solution (which may contain traces of barium) to dissolve CuO, is determined in the following way: 10 cc. are diluted to 100 cc., an excess of cupric carbonate is added, and the mixture kept on the water bath for several hours. Then, it is boiled for some time, filtered, the excess $CuCO_3$ washed carefully, filtrate and washings brought to 250 cc., and Cu" determined iodometrically. Now, $Cu(OH)_2$ is formed in the main portion, as follows: A quantity of $CuSO_4$, amounting to 110% of the capacity for Cu-uptake, calculated from the analysis, is dissolved in the amino acid mixture, under gentle heating, and an equivalent amount (to $CuSO_4$) of $Ba(OH)_2$ solution is added. Immediately, the deep blue solution of the Cu-compounds of amino acids is formed. The mixture is allowed to stand for at least 48 hours; in addition to $BaSO_4$ and excess of $Cu(OH)_2$, there are Cu-salts of by-products and other impurities carried down in the precipitate. At the same time, reducing substances which may be present, are decomposed, forming a small quantity of $Cu_2O$. After filtering and reducing in vacuo to about 250 cc., the solution is poured into 4500 cc. acetone. Immediately, the main part of the amino acids (83%–85%) is precipitated in the form of their light blue Cu-compounds. The crystalline precipitate may be filtered off by suction, or centrifuged, at once. It is washed with acetone, and forms fraction I.

The acetone mother liquor is concentrated in vacuo to 50 cc., acetone being recovered. To this concentrate, from which a part of the remaining Cu-salts starts crystallizing, an equal volume of ethanol, containing 10–15% ether, is added with vigorous shaking. The Cu-salts which have been dissolved in acetone, are precipitated so completely now, that the filtered solution is only slightly blue, and is discarded. The precipitate, washed with ethanol-ether mixture, forms fraction II.

The combined fractions I and II are dissolved in 1 liter water, and the Cu-salts are decomposed with $H_2S$. The filtrate from cupric sulfide is only slightly yellow; it is allowed to stand in the refrigerator for 24 hours; most of the tyrosine separates as crystals of a surprising purity, and is filtered off. The solution is now freed from last traces of Ba with $H_2SO_4$. After complete evaporation in vacuo, the amino acids remain as very slightly yellowish mass, and can be ground to a white powder, clearly soluble in water to 8–10%. The solution has a pH of about five, and is stable.

*Yield of dry amino acids.*—85–88 g. Total N: 14.5%. Even a concentrated solution gives no biuret reaction.

The behavior of the Cu-salts, as described above, was completely unexpected, as some Cu-salts of amino acids are known to be only very slightly soluble in water, for example, the Cu-salts of cystine, aspartic acid, or tyrosine. In the mixture, however, they are kept in solution by action of the highly soluble copper salts of the di-amino acids, and of certain aliphatic alpha-amino-mono-carboxylic acids. This effect, as yet unknown and unforeseen, may also be observed on an artificial mixture of amino acids.

*Example II*

In place of the $Ba(OH)_2$ of Example I, freshly prepared $Ca(OH)_2$ is used for neutralization of the sulfuric acid and nascent $Cu(OH)_2$ is prepared in a similar manner with lime instead of barium hydrate. Having determined the necessary amounts of copper ion, molar equivalents of $CuSO_4$ and $Ca(OH)_2$ are added and the hydrolysate is left standing, for about 24 hours, at room temperature or under refrigeration. After removal of the precipitated solids, the amino acid-copper salts contained in the liquid are decomposed with $H_2S$. The resulting cupric sufide, which apparently is able to also carry down impurities that may be still left in the hydrolysate, leaves, after being removed, an amino acid solution that is substantially pure, save for small quantities of $CaSO_4$ which stay in solution but may easily be eliminated with $Ba(OH)_2$ and oxalic acid. The hydrolysate may now be utilized either as such or be used for the preparation of crystalline amino acids.

*Example III*

100 g. blood protein are hydrolyzed, by refluxing, for about 16 hours with hydrochloric acid having a strength of 20 percent by weight of the hydrolysate mix. The extract, after being separated from the solids remaining after or having formed during the hydrolysis, is concentrated in vacuo to preferably syrupy consistency while simultaneously being freed of most of the hydrochloric acid. For the removal of small amounts of hydrochloric acid that sometimes are not eliminated during the concentration in vacuo, lead carbonate may be used. We find it convenient, however, to utilize especially prepared ion-exchange materials (such as Deacidite or Amberlite IR–4) which permit the removal of mineral acid without any loss of essential amino acids. The procedure of purifying and separating amino acids from foreign substances is then carried out in the same manner as illustrated in Example I or II. An end-product, substantially enriched in indispensable amino acids and thus of superior utility for certain purposes, may be obtained by regulating the above ion-exchange process in such a manner that glutamic and aspartic acid, two non-essential constituents, are eliminated from the amino acid mixture.

*Example IV*

Same procedure as in Example I; the purification is carried out using the nickel salts instead of the copper salts. Ni-uptake is determined in analogous manner by boiling with $NiCO_3$, and determination of Ni with dimethylglyoxime. Formation of $Ni(OH)_2$ from $NiSO_4$ and $Ba(OH)_2$ is analogous, and from this step on the procedure is identical with that described in Example I or II.

In the same way, cobalt may be used. Cobalt and nickel form solid amino acid salts, whereas zinc, manganese and cadmium hydroxides yield sticky metal salts of amino acids. None of these metals is as advantageous as Cu.

Of course, the final amino acid mixture does not contain tryptophane, which is destroyed by the acid hydrolysis. The process, however, can be applied to any enzymatic hydrolysate yielding products giving negative biuret test. Any other protein may be used in place of casein or blood protein.

This application is a continuation-in-part of our application Serial No. 529,550, filed April 4, 1944, now abandoned.

We claim:

1. The method of obtaining purified amino acids from an aqueous hydrolysate of proteinous matter which comprises adding to the aqueous hydrolysate a sulfate of a metal from the group consisting of copper and nickel and also adding an alkaline earth hydroxide, removing the precipitated solids, and converting the dissolved amino acid-metal compounds into free amino acids.

2. The method of obtaining purified amino acids from an aqueous hydrolysate of proteinous matter which comprises adding copper sulfate and an alkaline earth hydroxide to the aqueous hydrolysate, removing the precipitated solids, and converting the dissolved amino acid-copper compounds into free amino acids.

3. The method of obtaining purified amino acids from an aqueous hydrolysate of proteinous matter which comprises adding to the aqueous hydrolysate a sulfate of a metal of the group consisting of copper and nickel and also adding an alkaline earth hydroxide, removing the precipitated solids, treating the remaining solution with hydrogen sulfide, removing the resulting precipitate, and recovering from the solution free amino acids in crystalline form.

4. The method of recovering purified amino acids from sulfuric acid hydrolyzed protein which comprises removing the sulfuric acid from the hydrolysate with calcium hydroxide, driving off ammonia, adding copper sulfate in excess over that necessary to produce copper salts of all the amino acids present, adding calcium hydroxide in amounts equivalent to the copper sulfate used, removing precipitated solids, concentrating the solution to a point short of precipitation of amino acid-copper salts, removing any calcium sulfate as calcium oxalate and barium sulfate, treating the solution with hydrogen sulfide, separating the resulting precipitate from the solution and recovering free amino acids from said solution in crystalline form.

CARL NEUBERG.
HILDA LUSTIG.

REFERENCES CITED

The following references are of record in the file of this patent:

UNITED STATES PATENTS

| Number | Name | Date |
|---|---|---|
| 2,222,993 | Toennies | Nov. 26, 1940 |
| 2,287,235 | Flint et al. | June 23, 1942 |
| 2,323,445 | Bockmuhl et al. | July 6, 1943 |
| 2,389,873 | Schiller | Nov. 27, 1945 |

OTHER REFERENCES

Town: Biochem. Journal, vol. 22, pp. 1083-6 (1928) (copy in U. S. Dept. of Agriculture Library); ibid., vol. 30, pp. 1837-44 (1936); ibid., vol. 35, pp. 417-32 (1941) (copies in Scientific Library).